United States Patent [19]

Deutsch

[11] Patent Number: 4,936,083
[45] Date of Patent: Jun. 26, 1990

[54] GRASS CATCHER FOR LAWN MOWERS
[75] Inventor: Aron Deutsch, Brooklyn, N.Y.
[73] Assignee: Air Filters, Inc., Newton, N.J.
[21] Appl. No.: 382,189
[22] Filed: Jul. 20, 1989
[51] Int. Cl.$^5$ ............................................. A01D 34/70
[52] U.S. Cl. ..................................................... 56/202
[58] Field of Search ........................ 56/199, 202–207, 56/16.6

[56] References Cited

U.S. PATENT DOCUMENTS

| | | | |
|---|---|---|---|
| 3,732,675 | 5/1973 | Armstrong | 56/202 |
| 4,522,019 | 6/1985 | Edwards et al. | 56/16.6 X |
| 4,774,802 | 10/1988 | Azbell | 56/202 |

*Primary Examiner*—Thuy M. Bui
*Attorney, Agent, or Firm*—Dow, Lohnes & Albertson

[57] ABSTRACT

A grass catcher adapted to be detachably secured to a mower deck of a lawn mower which comprises a frame structure whose top and front frames are pivotally connected with each other. Lateral frame members are also pivotally connected at their inner ends to the front frame while their outer ends are adapted to be threadably secured to the rear area of the top frame. The hinged connections permit folding-together of the frame structure into a relatively flat package to reduce space requirements during shipping and storage.

14 Claims, 3 Drawing Sheets

GRASS CATCHER FOR LAWN MOWERS

FIELD OF INVENTION

The present invention relates to a grass catcher, and more particularly to a grass catcher which can be attached to the chute of a lawn mower, particularly, semi-professional lawn mowers.

BACKGROUND OF THE INVENTION

Grass catchers for lawn mowers are known as such in the prior art. One type of such grass catchers is made of rigid bodies as disclosed, for example, in the U.S. Pat. No. 4,399,647. However, in addition to being relatively costly to manufacture, they are relatively heavy, cannot be replaced in case of wear or damage to only a part, for example, by obstructions encountered during mowing, and are more likely to cause turf gouging. Additionally, they represent a relatively large volume requiring a large amount of space for shipping and storing. To avoid the space problems, a grass catcher enabling a knock-down condition has already been proposed in U.S. Pat. No. 4,250,698. However, this type of grass catcher still entails the disadvantages mentioned hereinabove.

Another type of grass catcher construction utilizes a frame over which a flexible bag made, for example, of nylon is mounted. A typical grass catcher of this type is shown in U.S. Pat. No. 4,214,424 in which the catcher is attached to a back plate, itself securely mounted on the mower deck.

The present invention is concerned with a grass catcher that permits the use of an extraordinarily simple frame structure, yet avoids the problem of large space requirements for shipping and storage. More specifically, the present invention relates to the type of frame structure supporting thereon a nylon basket, which consists of a top frame, of a front frame adapted to be attached to a back plate and extending at right angle to the top frame as well as of lateral frame members acting as struts and connecting the lower end of the front frame with the rear end of the top frame. This type of frame, which is normally made of welded-together round rod material, is extraordinarily simple, permits suspension of the basket in a floating-like manner and is relatively lightweight. Additionally, its readily detachable connection with the back plate permits ease of emptying out of the grass catcher when filled with mown grass. The prior art frame constructions consisted of rigid frames welded together so that the external dimensions were determined by the areas of the top frame and the front frame. The resulting space requirement for shipping and storing was therefore relatively large.

The present invention overcomes the pre-existing drawbacks of the prior art frame constructions by providing a foldable frame construction so that the entire grass catcher shipping package requires only a height of about seven inches.

The underlying problems are solved according to the present invention in that the top frame and front frame are pivotally connected with one another and the lateral frame members are pivotally connected with the front frame so that the entire frame structure can be folded together into a more or less flat configuration. By the use of suitably configured lateral frame members, however, the frame structure can be readily assembled in a simple manner by the end user by threadably connecting the free ends of the lateral frame members to the rear area of the top frame, provided for that purpose with suitable threaded gusset-like plates welded in place between two frame members.

Hingedly connected frames are known for grass catchers, as disclosed, for example, in U.S. Pat. No. 4,175,603. However, the hingedly connected frame of this patent, which can assume either a rectangular position or a flat position is for entirely different purposes. The U.S. Pat. No. 3,732,675 also discloses an arrangement providing a collapsed position which, however, is for a different type of frame structure and achieved by different means.

The present invention thus provides significant improvements in handling and storing grass catchers by the use of a frame structure, known as such in the art, in which the top and front frame are hingedly connected with each other, and the lateral frame members are hingedly connected to the sides of the front frame so that the entire frame structure can be folded together into a relatively flat package for shipment and storage.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
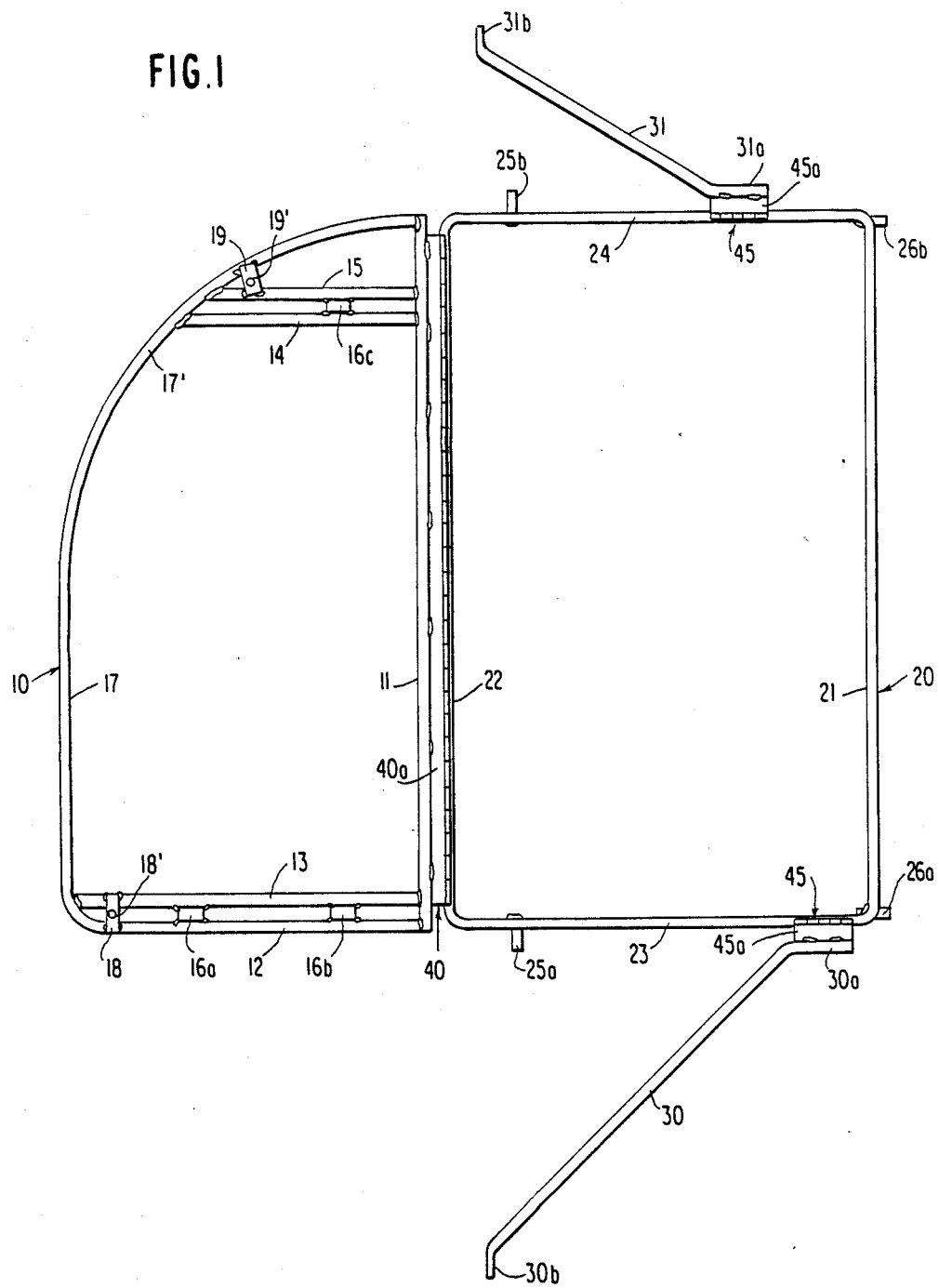
FIG. 1 is a plan view on the grass catcher frame structure in accordance with the present invention when pivoted into a single plane.
Figure 2:
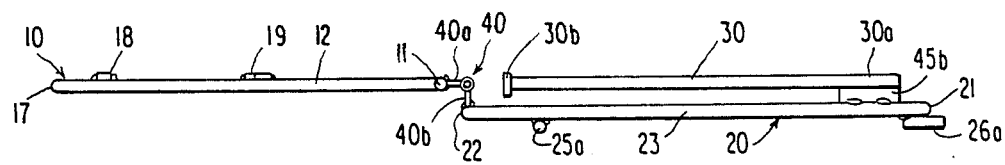
FIG. 2 is a front elevational view of the frame structure shown in FIG. 1.

Referring now to the drawing wherein like reference numerals are used throughout the various views to designate like parts, the grass catcher frame structure includes a top frame generally designated by reference numeral 10, a front frame generally designated by reference numeral 20 and lateral frame members 30 and 31. The top frame 10 consists of a longitudinal member 11, of a first pair of spaced side members 12 and 13 along the left side as viewed in FIG. 3, and of a second pair of spaced side members 14 and 15 along the right hand side, as viewed in FIG. 3. The first pair of parallel side members 12 and 13 are interconnected by spacer members 16a and 16b while the second pair of spaced side members 14 and 15 are interconnected by a spacer member 16c. The top frame 10 further consists of a longitudinal member 17 which extends over a part of its length substantially parallel to the longitudinal member 11 and then merges with the longitudinal member 11 by way of its curved portion 17'. The rear ends of the second pair of side members 14 and 15 are securely connected with the curved portion 17' of frame member 17. The side members 12 and 13 of the top frame 10 are further interconnected by means of a gusset-like plate 18 provided with a threaded hole 18'. Similarly, the curved portion 17' of frame member 17 is interconnected with the side frame member 15 by way of a gusset-like plate 19 provided with a threaded hole 19'. The frame members 11, 12, 13, 14, 15, 17, 17' are made of suitable rod material, for example, one-quarter inch rod whereby, for ease of manufacture, the frame members 12, 17, 17' are made in one piece with the transition from side member 12 into frame member 17 suitably rounded-off, as shown in FIG. 1, and are welded to the longitudinal frame member 11 at both ends thereof. The other frame members 13, 14 and 15 as well as the spacer members 16a, 16b and 16c and the gusset-like plate members 18 and 9 are secured to the respective top frame parts by welding.

The front frame 20 consists of two parallel longitudinal frame members 21 and 22 interconnected by substantially parallel side frame members 23 and 24 to provide a generally rectangular opening with the corners suitably rounded-off, as shown in FIG. 1. The frame members 21, 22, 23 and 24 may be made again from appropriate quarter-inch rod material and preferably are bent into shape as shown in the drawing from a single piece suitably welded together near its end in one corner. Additionally, two laterally projecting stub members 25a and 25b are welded to the side frame members 23 and 24 of front frame 20 at substantially right angle with respect thereto. Furthermore, two downwardly extending stub members 26a and 26b are welded to the longitudinal frame member 21 at substantially right angle thereto. The stub members 25a, 25b and 26a, 26b, which may also be made from the same rod material as the other frame members, are used for purposes of detachably connecting the grass catcher to the back plate generally designated by reference numeral 60 as will be described more fully hereinafter.

The top frame 10 is hingedly connected with the rear frame 20 by way of a hinge generally designated by reference numeral 40 which extends over nearly the entire length of the respective longitudinal frame members 11 and 22, in turn, securely connected to the respective hinge parts 40a and 40b by welding.

Figure 3:
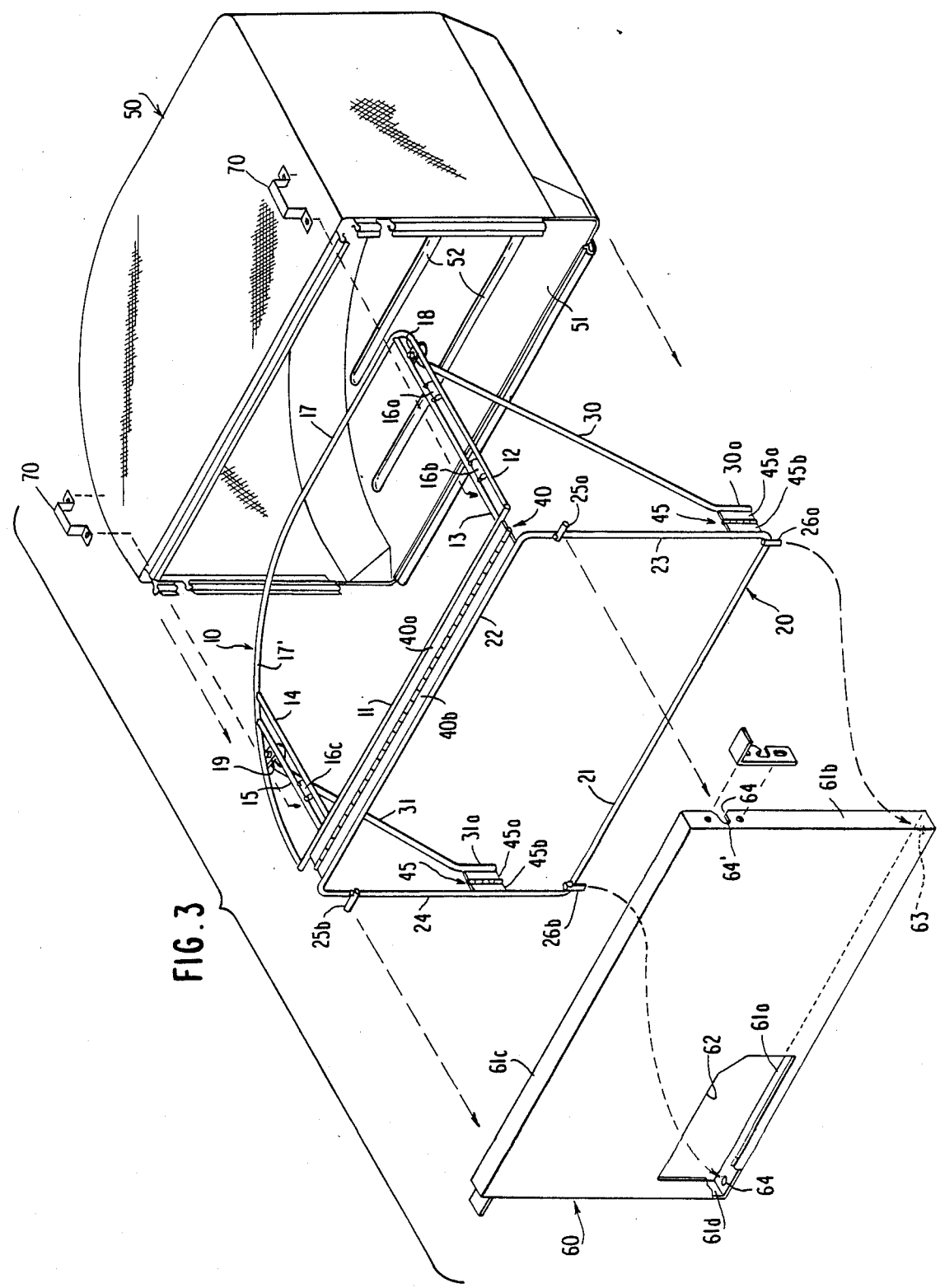
FIG. 3 is a perspective view of the assembled grass catcher in accordance with the present invention.

The lateral frame members 30 and 31 are substantially rectilinear over a major part of their length and are made from similar rod material as the other frame parts. The inner ends 30a and 31a are bent off at an obtuse angle as shown in FIGS. 1 and 3 where they are rigidly connected by welding, with the hinge parts 45a of hinges generally designated by reference numeral 45, the other hinge parts 45b of which are securely connected by welding with the side members 23 and 24 of front frame 20. It can thus be seen that the top frame 10 is pivotally connected with the front frame 20 and the lateral frame members 30 and 31 are pivotally connected with the front frame 20.

The outer free ends 30b and 31b of the lateral frame members 30 and 31 opposite the inner ends 30a and 30b are flattened out and bent at an obtuse angle with respect to rectilinear lateral frame members 30 and 31 for connection with the top frame 10. For that purpose, the flattened out parts 30b and 31b are provided with holes whereby wing bolts or the like (not shown) are used to securely fasten the outer ends 30b and 31b to the gusset-like plate members 18 and 19 in the assembled condition of the frame structure.

Figure 4:
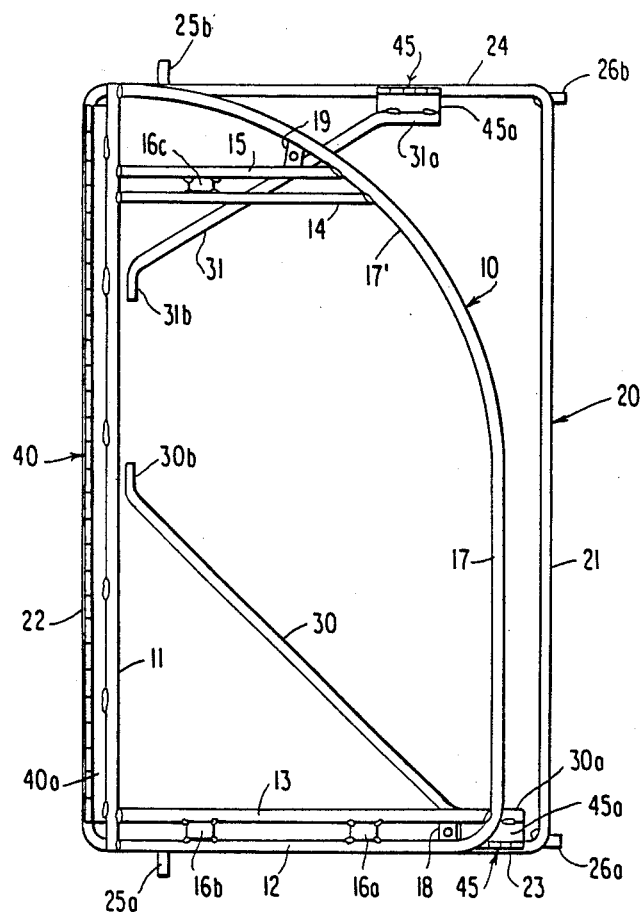
FIG. 4 is a plan view showing the frame structure in its folded-together condition.

The grass catcher frame structure of the present invention can be folded together in the non-assembled condition by folding the lateral frame members 30 and 31 inwardly into the area of the front frame 20 and thereafter folding down the top frame 10 over the thus folded-down lateral frame members 30 and 31 (FIG. 4).

This permits a considerable saving in space during shipment and storage of the non-assembled grass catcher with ease of assembly by the end user. Furthermore, the frame structure can be manufactured in a simple manner using rod-shaped material and simple hinges which are interconnected by conventional welding techniques.

The grass catcher bag generally designated by reference numeral 50 is made of nylon material and provided with a polyethylene bottom 51 sewn to the nylon bag to lend additional strength to the bottom of the bag which must carry the weight of the mown grass. The bag 50 together with its bottom 51 is provided along its free edges with so-called "J" strips which are appropriately secured to the nylon bag 50 by sewing and to the polypropylene bottom 51 by rivet-like fasteners. The bag 50 together with its bottom can thus be securedly mounted over the respective frame members of the top and front frames 10 and 20 by the use of appropriate clips of conventional construction, as known in the art. For purposes of reinforcement and ease of movement of the bag over ground obstructions, the bottom 51 may be further provided with reinforcing grooves 52.

After the bag 50, 51 is secured to the frame structure, the grass catcher is detachably secured to the back plate generally designated by reference numeral 60 which is mounted over the chute opening of the mower deck by conventional means. The back plate 60 is provided with flanges 61a, 61b, 61c and 61d turned at right angle toward the grass catcher frame and bag assembly. An opening 62 for the passage of the mown grass is provided near a lower corner of the back plate 60. To permit easy assembly of the grass catcher onto the back plate 60, the latter is provided with two holes 63 and 64 at its in-turned flange 61a to receive the stub members 26a and 26b. Additionally, the lateral flange portions 61b and 61d are provided with V-shaped notches 64 terminating in elongated grooves 64' of a size complementary to the stub members 25a and 25b l which are removably received herein and locked in position by latch members slidably mounted externally on the flange portions 61b and 61d, as known in the prior art. Since the connection of the bag to the frame structure and the fastening of the grass catcher to the back plate utilize conventional means, a detailed description thereof is dispensed with herein.

Suitable handles 70 are detachably secured in a conventional manner to the top frame 10 by the use of bolts extending through the bag 50 within the area between side members 12, 13 and 14, 15 and held in place by nuts with the use of appropriate washers placed against the underside of these side members from within the bag 50.

The frame structure according to the present invention enables ready assembly of the foldable frame structure, yet assures satisfactory operation in the assembled condition. The polypropylene bottom, which is freely floating, contributes to the prevention of undue turf gouging, yet offers sufficient strength to carry, for example, three bushels of mown grass.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A grass catcher adapted to be detachably secured to a mower deck of a lawn mower, comprising a frame structure including top frame means, front frame means, and lateral frame members having inner and outer ends, means enabling folding of the frame structure into a relatively flat package to reduce space requirements for shipping and storing including hinge means connecting the top frame means to the front frame means and further hinge means connecting each of the lateral frame members with the front frame means, and means for threadably connecting the outer ends of the lateral frame members to the rear area of the top frame means.

2. A grass catcher according to claim 1, wherein the front frame means includes substantially parallel rigidly interconnected longitudinal and side frame members defining an opening, and means at least along the side frame members of the front frame means for rapidly detachably connecting the grass catcher to the mower deck.

3. A grass catcher according to claim 1, wherein the frame structure essentially consists of the top frame means, the front frame means and the two lateral frame members.

4. A grass catcher according to claim 3, wherein the lateral frame members are substantially rectilinear over a major part of their length with their inner ends bent at an obtuse angle for connection within the further hinge means and with their outer ends flattened out and bent at an obtuse angle to enable threaded connection with the top frame means.

5. A grass catcher according to claim 4, wherein the top frame means includes fixed gusset-like plate members provided with threaded holes to receive threaded bolts for securely but detachably fastening the outer ends of the lateral frame members to the top frame means by way of the gusset-like plate members, and wherein the flattened-out outer ends of the lateral frame members are provided with holes through which the bolts can extend.

6. A grass catcher according to claim 5, wherein each of the gusset-like plate members is welded to two respective frame members generally extending from the front to the rear of the top frame means.

7. A grass catcher according to claim 6, wherein all frame parts of the frame structure with the exception of the hinge means are made from rod-shaped material, and welded connections are used throughout except for the threaded connection of the outer ends of the lateral frame parts to the top frame means.

8. A grass catcher according to claim 7, further comprising a nylon bag having a polypropylene bottom detachably secured to the top and front frame means.

9. A grass catcher according to claim 8, wherein the front frame means includes substantially parallel rigidly interconnected longitudinal and side frame members defining an opening, and means at least along the side frame members of the front frame means for rapidly detachably connecting the grass catcher to the mower deck.

10. A grass catcher according to claim 1, wherein the lateral frame members are substantially rectilinear over a major part of their length with their inner ends bent at an obtuse angle for connection with the further hinge means and with their outer ends flattened out and bent at an obtuse angle to enable threaded connection with the top frame means.

11. A grass catcher according to claim 10, wherein the top frame means includes fixed gusset-like plate members provided with threaded holes to receive threaded bolts for securely but detachably fastening the outer ends of the lateral frame members to the top frame means by way of the gusset-like plate members, and wherein the flattened-out outer ends of the lateral frame members are provided with holes through which the bolts can extend.

12. A grass catcher according to claim 11, wherein each of the gusset-like plate members is welded to two respective frame members generally extending from the front to the rear of the top frame means.

13. A grass catcher according to claim 1, wherein all frame parts of the frame structure with the exception of the hinge means are made from rod-shaped material, and welded connections are used throughout except for the threaded connection to the outer ends of the lateral frame parts to the top frame means.

14. A grass catcher according to claim 1, further comprising a nylon bag having a polypropylene bottom detachably secured to the top and front frame means.

* * * * *